United States Patent [19]

Sander et al.

[11] 4,187,143
[45] * Feb. 5, 1980

[54] MANUFACTURE OF FIBRIDS FROM POLY(AMIDE-IMIDE) RESINS

[75] Inventors: Bruno Sander, Ludwigshafen; Kurt Scherling, Hemsbach; Rolf Steinberger, Schifferstadt; Eckhard Ropte, Ludwigshafen, all of Fed. Rep. of Germany

[73] Assignee: BASF Aktiengesellschaft

[*] Notice: The portion of the term of this patent subsequent to May 23, 1995, has been disclaimed.

[21] Appl. No.: 831,749

[22] Filed: Sep. 9, 1977

Related U.S. Application Data

[62] Division of Ser. No. 727,585, Sep. 28, 1976, Pat. No. 4,091,058.

[30] Foreign Application Priority Data

Oct. 1, 1975 [DE] Fed. Rep. of Germany ....... 2543824

[51] Int. Cl.$^2$ ............................................. D21F 11/00
[52] U.S. Cl. ...................... 162/157 R; 260/30.4 N; 428/400; 428/401; 528/350; 528/351; 528/352
[58] Field of Search ........................ 162/146, 157 R; 260/30.4 N, 37 N, 78 TF; 264/140, 11, 14, 205; 428/401, 364, 400; 528/350, 351, 352

[56] References Cited

U.S. PATENT DOCUMENTS

| 2,999,788 | 9/1961 | Morgan ........................ 162/157 R |
| 4,060,451 | 11/1977 | Uchiyama et al. ............ 162/157 R |

OTHER PUBLICATIONS

Tappi, "Freeness Scale Conversion", (Corr. 1945).

*Primary Examiner*—S. Leon Bashore
*Assistant Examiner*—Peter Chin
*Attorney, Agent, or Firm*—Keil & Witherspoon

[57] ABSTRACT

Fibrids are prepared by introducing a solution of a polymer into a liquid precipitation medium while exposing it to shearing forces. A poly(amide-imide) resin solution is admixed with a solvent which is miscible with the resin solvent but which is a non-solvent for the resin itself.

2 Claims, 3 Drawing Figures

MANUFACTURE OF FIBRIDS FROM POLY(AMIDE-IMIDE) RESINS

This is a division of application Ser. No. 727,585 filed Sept. 28, 1976 now U.S. Pat. No. 4,091,058, May 23, 1978.

The present invention relates to a process for the manufacture of fibrids by introducing a solution of a polymer into a liquid precipitation medium whilst exposing it to shearing forces.

The manufacture of fibrids from polymers, by dissolving the latter in a suitable organic solvent and introducing the resulting solution into a liquid precipitation medium whilst at the same time exposing it to shearing forces, has been disclosed.

However, if the conventional process is applied to solutions of poly(amide-imide) resins, finely divided pulverulent particles, showing no tendency to form a web, are obtained in place of discrete fibrids. The particles obtained in most cases have a high solvent content, so that their subsequent working up is difficult and expensive.

It is an object of the present invention to provide a process in which solutions of poly(amide-imide) resins are passed in a liquid precipitation medium whilst exposed to shearing forces, whereby discrete fibrids exhibiting a high degree of fibrillation and a high tendency to form a web are obtained directly.

A further object is the fibrids which are obtained by the process.

We have found that these objects are achieved if a solution of a poly(amide-imide) resin in an organic solvent is mixed, before introduction into the precipitation medium, with a liquid which does not dissolve the poly(amide-imide) resin but is homogeneously miscible in all proportions with the organic solvent and with the precipitation medium.

It is a further object of the invention to provide fibrids, of poly(amide-imide) resins, which have a high degree of fibrillation and a good web-forming capacity.

We have found that this object is achieved, according to the invention, by providing fibrids of poly(amide-imide) resins which are from 0.1 to 5 mm long and from 5 to 200 μm thick and have a freeness of from 20° to 90° SR and a specific surface area of from 1 to 80 m²/g.

For the purposes of the invention, fibrids are fibrous particles of synthetic polymers which morphologically, in size and shape, and in their properties resemble cellulose fibers. The manufacture of these fibrids is disclosed, for example, in U.S. Pat. Nos. 2,999,788 and 2,988,782.

The fibrids are produced by dissolving a synthetic polymer in an organic solvent and introducing the resulting solution into a liquid precipitation medium whilst at the same time exposing it to shearing forces. Suitable liquid precipitation media are in principle all liquids in which the synthetic polymers are insoluble and with which the organic solvents employed are miscible in all proportions. In the present case, it has proved particularly appropriate to use water as the precipitation medium. In order to increase the viscosity of the precipitation medium the water may be entirely or partially replaced by, for example, ethylene glycol, diethylene glycol or glycerol. Dispersing assistants may also be added to the precipitation medium.

In the present instance, i.e. when using a poly(amide-imide) resin as the synthetic polymer, 1-methyl-2-pyrrolidone, N,N-dimethylformamide and N,N-dimethylacetamide have proved particularly suitable organic solvents for the polymers. The poly(amide-imide) resin solutions employed in general have a solids content of from 5 to 35 percent by weight, preferably from 15 to 25 percent by weight, and their viscosity is from 2,000 to 200,000 cP, preferably from 15,000 to 60,000 cP, measured by means of a falling ball viscometer.

Before being introduced into the precipitation medium, the solution of a poly(amide-imide) resin in one of the above organic solvents is mixed with a liquid which is a non-solvent for the poly(amide-imide) resin but is miscible in all proportions with the organic solvent and the precipitation medium. The preferred organic liquid is an organic cyclic ether, e.g. tetrahydrofuran or 1,4-dioxane. The volume ratio of solvent to cyclic ether is from 1:1.5 to 1:5, preferably from 1:2.5 to 1:4. The cyclic ethers or other non-solvents for the polymer may be added to the polymer solution until the polymer starts to precipitate. Within the above limits, the most advantageous volume ratio can in each case be determined by a simple laboratory experiment.

Poly(amide-imide) resins are polymers which contain recurring units of amide groups and imide groups, for example as shown in the general formula

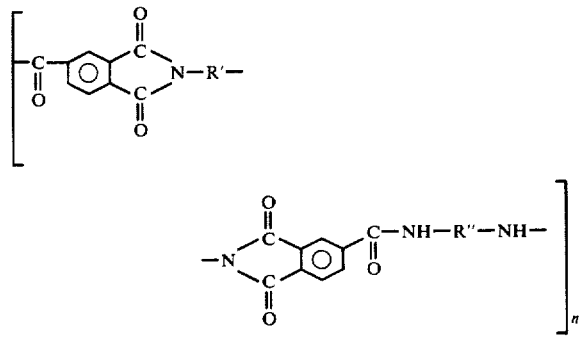

where n is an integer, R'=R" or R'≠R", R' and R" are m- or p-phenylene or

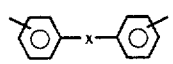

and x is CH₂, O, S, CO or SO₂, and where the polymer may or may not contain additional amide linkages of the structure

The manufacture, properties and use of conventional poly(amide-imide) resins are described, for example, in Soviet Plastics (a translation from Plast. Massy.) 1970 (8), 12–16, by L. I. Chudina et al. Poly(amide-imide) resins of the above formula are manufactured in accordance with German Laid-Open Applications DOS Nos. 1,425,666 and 2,441,020 by reacting diimide-dicarboxylic acids with diisocyanates or diimide-dicarboxylic acid chlorides with diamines.

Introduction of the solution of poly(amide-imide) resin, which additionally contains a non-solvent for the polymer, e.g. a cyclic ether, into a liquid precipitation medium whilst exposing it to shearing forces is to be understood as rapid and thorough mixing of the said solution with a major amount of the liquid precipitation medium, which is subjected to shearing forces, at room temperature. The volume ratio of polymer solution to precipitation medium may be from 1:5 to 1:100 and preferably from 1:10 to 1:20.

The field of shearing forces is generated, in particular, by apparatuses which produce such a field mechanically by means of rotating elements. Commercial machinery which is used for dispersing and homogenizing, for instance, polymer dispersions, is suitable for this purpose. If the process is carried out batchwise, high speed mixers or Ultra-Turrax type apparatus which generates a field of shearing forces can be used.

Devices useful for creating the shearing forces in the production of the subject fibrids are illustrated in the drawings wherein.

Figure 1:
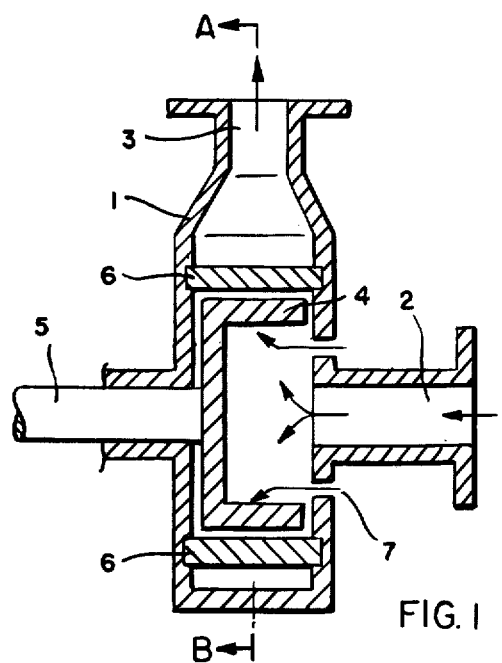
FIG. 1 is a diametric section of a rotor-stator type apparatus for creating the shearing forces mechanically.
Figure 3:
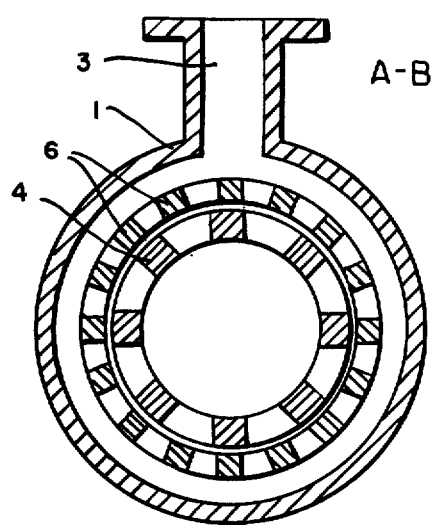
FIG. 3 is a section view taken on section plane A–B of FIG. 1.

If the process is carried out continuously it is possible to use, for example, the following apparatus (FIG. 1).

A housing (1) having a feed nozzle (2) and outlet nozzle (3) contains a rotor (4) which is driven by a shaft (5). This rotor (4) causes the liquid precipitation medium, which is present in the housing and is continuously fed in through the feed nozzle (2), to rotate. The kinetic energy of the rotor is thereby transferred to the liquid precipitation medium. The liquid precipitation medium which has been accelerated is braked in an annular braking zone (6). A part of the kinetic energy is thereby converted to heat. The braking zone is formed by a ring-shaped stator which possesses sharp-edged orifices and baffles.

To produce the fibrids, the polymer solution, containing a non-solvent for the polymer, is introduced by means of a metering pump through a pipeline (7) having an internal diameter of 4 mm into the liquid precipitation medium, the outlet orifice of the pipeline being at the point where the precipitation medium undergoes its maximum acceleration. A fibrid suspension is discharged continuously at the outlet nozzle (3). The mean energy densities can be from 20 to 80 watt.sec/cm³.

The field of shearing forces can also be generated hydraulically. For example, if the solution of the polymer is expelled through one or more nozzles and if desired at the same time the precipitation medium, travelling at a flow rate of at least 5 m/sec, is thoroughly mixed with the solution of the polymer in a field of shearing forces, fibrids are again obtained. The mean energy density in the zone in which the fibrids are formed is from 5 to 30 watt.sec/cm³.

According to a special embodiment, the thorough mixing of the flowing media takes place in an impulse exchange chamber which is located downstream of, and concentrically with, the two-fluid nozzle. This apparatus is disclosed in German Laid-Open Application No. 2,208,921.

In all variants of the process, stable, discrete fibrids are obtained directly. They can be separated from the precipitation medium and from the greater part of the organic solvent by filtering or centrifuging. The residual solvent is removed by washing with water on the filter or in the centrifuge. The organic solvents used, and the cyclic ethers, can be recovered by distillation from the mother liquor and from the wash water and be recycled to the process.

The fibrids manufactured according to the invention contain from 90 to 98 percent by weight of water and have a high sheet-forming or web-forming capacity when deposited on a wire from an aqueous suspension.

Aqueous suspensions of the fibrids manufactured according to the invention are produced by introducing the fibrids into water, whilst stirring. The stock density is from 0.2 to 2% and preferably from 0.5 to 1%.

Papery sheet-like structures can be obtained from the aqueous suspensions of the fibrids, after appropriate further dilution with water, on a paper machine or wet-laid nonwoven machine.

The fibrids according to the invention can also be mixed with cellulose fibers or with staple fibers of synthetic polymers in any desired ratio and the mixture can be processed on a paper machine to give self-supporting, coherent webs.

For the manufacture of coherent, self-supporting webs on a paper machine it is necessary that the webs should have a sufficiently high initial wet strength. A standard sheet (2.4 g) which has been manufactured from fibrids must have an initial wet strength of at least 80 g at a water content of 83 percent by weight. Standard sheets prepared from the fibrids, manufactured according to the invention, on a Rapid-Köthen sheet-forming apparatus have initial wet strengths of from 200 to 500 g.

The initial wet strengths are determined by means of the test instrument developed by W. Brecht and H. Fiebinger (Karl Frank, Taschenbuch der Papierprüfung, 3rd enlarged edition, Eduard Roether Verlag, Darmstadt, 1958, page 59). Test strips of size 30×95 mm are produced from the fibrids to be tested on a laboratory sheet-forming apparatus by inserting an appropriate frame. The thickness of the test strips (weight per unit area) is determined by the amount of pulp used. The load in g at which the test strip tears is then measured by means of the test instrument.

The particular advantage of the process according to the invention is that discrete fibrids, which are very highly fibrillated and virtually free from organic solvents, are obtained directly. The residual content of organic solvent in the fibrids is less than 0.1 percent by weight.

The degree of fibrillation of the fibrids obtained was ascertained by determining the freeness by the Schopper-Riegler method (Korn-Burgstaller, Handbuch der Werkstoffprüfung, 2nd edition, 1953, volume 4, Papier- und Zellstoffprüfung, pages 388 et seq., Springer-Verlag). For this determination, the fibrids are introduced into an aqueous suspension of constant stock consistency (2 g/l and 20° C.). The amount of water which is retained by the suspended fibrids under specific conditions is determined. The higher the degree of fibrillation of the fibrids, the greater is the amount of water absorbed (°Schopper-Riegler, °SR). The Schopper-Riegler values for an unbeaten sulfite cellulose are from 12° to 15° SR. By way of example, the Schopper-Riegler values for the fibrids used according to the invention are from 20° to 90° SR.

The specific surface area of the fibrids was determined by the BET nitrogen absorption method (S. Brunauer, T. H. Emmett and E. Teller, J. Amer. Chem. Soc., 60 (1938), 309).

In the Examples, parts and percentages are by weight.

EXAMPLE A 49.5 parts of 4,4'-diaminodiphenylmethane were dissolved in 627 parts of 1-methyl-2-pyrrolidone and 96 parts of trimellitic anhydride were added. After adding 125 parts of toluene, the theoretical amount of water was removed at from 140° to 150° C., and the toluene was recovered. On cooling the reaction mixture, the diimidedicarboxylic acid precipitated in a well-crystallized form. For the further conversion to the polyamide-imide, the reaction batch was brought to 80° C. and 62.5 parts of 4,4'-diphenylmethanediisocyanate were added. The temperature was then raised to 190° C. at the rate of 10° C./30 minutes. The mixture was then cooled to 120° C. and 1.25 parts of 4,4'-diphenylmethanediisocyanate were added twice more, at intervals of 1 hour. After 2 hours, a viscous poly(amide-imide) solution having a solids content of 22% and a solution viscosity of 34,600 cP (measured by means of a falling ball viscometer at 20° C.) was produced. The intrinsic viscosity of the polymer was 0.81 dl/g (measured as an 0.5 percent strength solution in 1-methyl-2-pyrrolidone at 30° C.).

EXAMPLE B 49.5 Parts of 4,4'-diaminodiphenylmethane and 96 parts of trimellitic anhydride were reacted in 627 parts of 1-methyl-2-pyrrolidone to give the diimide-dicarboxylic acid, as described in Example A. After the reaction solution had cooled, the diimidedicarboxylic acid which had crystallized out was filtered off and converted to its acid chloride by boiling with excess thionyl chloride or by reaction with phosgene in a chloroform suspension.

145.5 Parts of this acid chloride and 49.5 parts of 4,4'-diaminodiphenylmethane were reacted in 627 parts of 1-methyl-2-pyrrolidone at from 0° to 5° C., to give the polyamide-imide. After stirring for 30 minutes, a viscous solution was obtained, which had a solids content of 22%, a solution viscosity of 55,000 cP and an intrinsic viscosity of 1.00 dl/g.

EXAMPLE 1

3,000 Parts of tetrahydrofuran were added, whilst stirring, to a solution, of viscosity 34,600 cP, comprising 20 parts of poly(amide-imide) resin from Example A in 780 parts of 1-methyl-2-pyrrolidone.

Using the apparatus shown in FIG. 1 and described in more detail above, the polymer solution obtained was introduced via a pipeline (7), by means of a metering pump, into the precipitation medium, namely water, in the immediate vicinity of the rotor (4). At the same time, about a 20-fold amount by volume of water was fed to the machine via the feed nozzle (2). The fibrid suspension discharged at the outlet nozzle (3) was conveyed to a collecting vessel. The fibrids accumulated at the surface and were skimmed off. They were then drained on a suction filter and washed thereon, with water, until the residue was free from tetrahydrofuran and 1-methyl-2-pyrrolidone. The fibrids obtained are very finely fibrillated and have a length of from 0.2 to 1 mm and a thickness of from 10 to 50 $\mu$m. They contained 94.1% of water.

Sheets weighing 1 g and 2.4 g (standard sheet) were produced on a laboratoy sheet-forming apparatus (Rapid-Kothen) and proved easily removable from the wire. These sheets, comprising 100% of the fibrids manufactured according to the invention, exhibited a uniform formation and a good fiber bond. The initial wet strength of the standard sheet was measured to be 373 g. The freeness of the fibrids was 73° SR and the specific surface area 50.8 m$^2$/g.

COMPARATIVE EXAMPLE 1

The procedure followed was as described in Example 1 except that in place of 3,000 parts of tetrahydrofuran 3,000 parts of 1-methyl-2-pyrrolidone were added.

A finely divided powder, which tended to cake, was obtained. The product showed no sheet-forming properties.

EXAMPLE 2

2,705 Parts of tetrahydrofuran are added, whilst stirring, to a solution, of viscosity 34,600 cP, comprising 285 parts of poly(amide-imide) resin from Example A in 1,010 parts of 1-methyl-2-pyrrolidone. The process of manufacture and the working up were carried out as described in Example 1.

The following properties of the fibrids were measured:
Length: from 0.1 to 1.2 mm
Thickness: from 20 to 80 $\mu$m
Water content: 91.9%
Freeness: 32° SR
Initial wet strength of a standard sheet: 400 g
Specific surface area: 34.4 m$^2$/g

EXAMPLE 3

The procedure followed was as described in Example 1, except that 1,4-dioxane was used as the cyclic ether.

The following properties of the fibrids were measured:
Length: from 0.2 to 1 mm
Thickness: from 100 to 500 $\mu$m
Water content: 93.5%
Freeness: 33.8° SR
Initial wet strength of a standard sheet: 229 g
Specific surface area: 31.8 m$^2$/g

EXAMPLE 4

2,705 Parts of tetrahydrofuran are added, whilst stirring, to a solution, of viscosity 34,600 cP, comprising 285 parts of poly(amide-imide) resin from Example A in 1,010 parts of 1-methyl-2-pyrrolidone.

Figure 2:
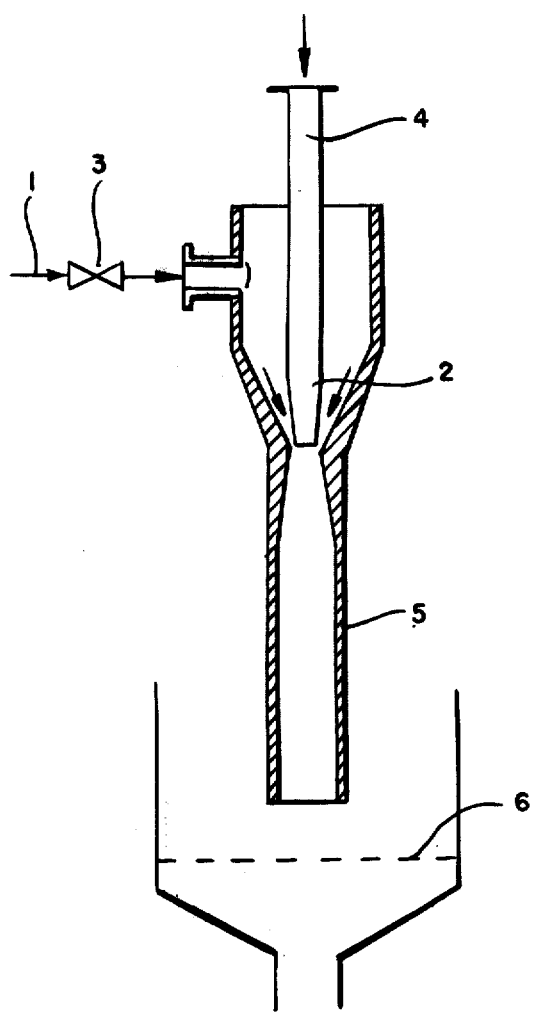
FIG. 2 is a side elevation, partly in diametric section, of another apparatus for creating the shearing force hydraulically.

To manufacture the fibrids, the injector nozzle shown in FIG. 2 is used. The polymer solution is fed through pipeline 1' to an injector nozzle 2', through which flows a jet of water 4', which is under a pressure of 6 bars. The water leaves the nozzle, which has a diameter of 3.7 mm, at a speed of 25 m/sec. The adjoining mixing tube 5', which is conical in its upper part, has an initial diameter of 12 mm. The polymer solution is metered in , through the valve 3', in such a way that 1 liter of solution is thoroughly mixed with 20 liters of water, which acts as the precipitation medium. The fibrids produced are collected by means of a screen 6'. They are drained on a suction filter and washed with water to remove the organic solvents.

The fibrids obtained have a very fine structure, with a length of from 0.2 to 2 mm and a thickness of from 10 to 100 $\mu$m. They contained 96.8% of water.

It proved possible to produce paper-like sheets, weighing 1 and 2.4 g, from the fibrids.

The following properties of the fibrids were measured:
Freeness: 75° SR

Initial wet strength of a standard sheet: 430 g
Specific surface area: 57.9 m²/g

EXAMPLE 5

730 Parts of tetrahydrofuran were added, whilst stirring, to a solution, of viscosity 34,600 cP, comprising 60 parts of poly(amide-imide) resin from Example A in 210 parts of 1-methyl-2-pyrrolidone.

To manufacture the fibrids, an Ultra-Turrax type T 45 apparatus, having a 400 watt drive, was used to generate a field of shearing forces. The shearing element of this apparatus is approximately at the center of the 10,000 parts of water introduced into a vessel. The polymer solution was metered into the precipitation medium directly at the point of maximum suction of the shearing element.

The fibrids which accumulated at the surface of the precipitation medium were removed from the vessel and freed from adhering solvent by washing with water on a laboratory suction filter.

The fibrids obtained have a very fine structure, with a length of from 0.2 to 1 mm and a thickness of from 1 to 10 μm. They contained 93.4% of water.

The following properties of the fibrids were measured:
Freeness: 63° SR
Initial wet strength of a standard sheet: 312 g

EXAMPLE 6

1,200 Parts of 1-methyl-2-pyrrolidone were added, whilst stirring, to a solution, of viscosity 55,000 cP, comprising 220 parts of poly(amide-imide) resin from Example B in 780 parts of 1-methyl-2-pyrrolidone.

The apparatus used to generate a field of shearing forces for the manufacture of the fibrids contained, as the stirrer, a crossed pair of knives at an angle of 45° to the plane of rotation. The apparatus had a 400 watt drive and the stirrer revolved at about 6,000 rpm. Diethylene glycol was used as the precipitation medium and the polymer solution was metered into it directly at the point of maximum shear. The ratio of polymer solution to precipitant was 1:5. The fibrids formed were filtered off on a laboratory suction filter and freed from adhering organic solvents by washing with water.

The fibrids obtained had a very fine structure, which was principally fibrous, with virtually no tape-like or film-like structures; their length was from 0.1 to 2 mm and their thickness from 0.5 to 10 μm. They contained 93.0% of water and had a freeness of 35° SR, whilst the initial wet strength of a standard sheet was 230 g.

We claim:

1. Fibrids consisting essentially of water and poly(amide-imide) resins having the formula

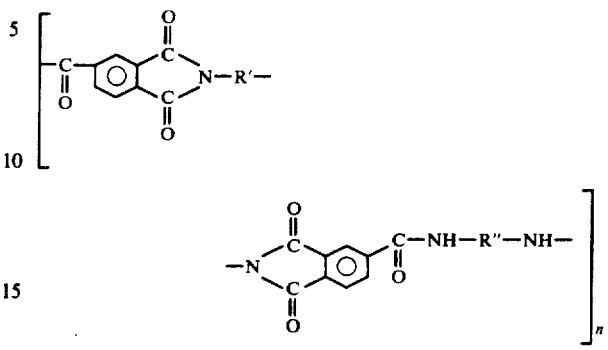

where n is an integer, R' and R" are the same or different and respectively are m-phenylene, p-phenylene or and x is $CH_2$, O, S, CO or $SO_2$, said polymer optionally containing additional amide linkages of the formula

—OC—R'—CONH—R"—NH— in which R' and R" have the meanings given above, produced by the process of dissolving a poly(amide-imide) resin in an organic solvent, selected from the group consisting of 1-methyl-2-pyrrolidone, N,N-dimethylformamide and N,N-dimethylacetamide, mixing the solution of the poly(amide-imide) resin in said organic solvent with a liquid in a volume ratio of said solvent to said liquid of from 1:1.5 to 1:5, said liquid being selected from the group consisting of tetrahydrofuran and 1,4-dioxane and said liquid being a non-solvent for said resin but being homogeneously miscible in all portions with water and with the organic solvent, and introducing the resultant solution of said resin, said solvent and said liquid into water while at the same time exposing it to shearing forces which forces are created by mechanically rotated elements at given energy densities in the range of 20 to 80 watt. sec/cm³ to form fibrids having a length of from 0.1 to 5 mm, a thickness of from 5 to 200 μm, a Schopper-Riegler freeness of from 20° to 90° SR and a specific surface area of from 1 to 80 m²/g.

2. Fibrids as claimed in claim 1, wherein said shearing forces are generated hydraulically at given energy densities in the zone in which the fibrids are formed in the range of 5 to 30 watt. sec/cm³.

* * * * *